United States Patent
Kiuchi

(10) Patent No.: US 8,514,424 B2
(45) Date of Patent: Aug. 20, 2013

(54) PRINTING APPARATUS, PRINTING RESUMING METHOD, AND STORAGE MEDIUM

(75) Inventor: Yohei Kiuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 12/954,426

(22) Filed: Nov. 24, 2010

(65) Prior Publication Data

US 2011/0134461 A1    Jun. 9, 2011

(30) Foreign Application Priority Data

Dec. 9, 2009 (JP) ................................ 2009-279425

(51) Int. Cl.
*G06F 15/00* (2006.01)

(52) U.S. Cl.
USPC .......................... 358/1.14; 358/1.17; 358/1.15

(58) Field of Classification Search
None
See application file for complete search history.

(56) References Cited

U.S. PATENT DOCUMENTS

| 2002/0126309 A1 | 9/2002 | Shimada | |
| 2008/0309979 A1* | 12/2008 | Honda | 358/1.17 |
| 2009/0001650 A1* | 1/2009 | Ishikawa et al. | 270/58.19 |
| 2009/0073482 A1 | 3/2009 | Tsuchiya | |
| 2009/0086253 A1* | 4/2009 | Okubo | 358/1.14 |
| 2009/0161140 A1* | 6/2009 | Devries | 358/1.14 |

FOREIGN PATENT DOCUMENTS

| JP | 09-311770 A | 12/1997 |
| JP | 2002-091747 A | 3/2002 |
| JP | 2002-318509 A | 10/2002 |
| JP | 2005-037434 A | 2/2005 |
| JP | 2005-210754 A | 8/2005 |
| JP | 2009-075634 A | 4/2009 |

* cited by examiner

*Primary Examiner* — Vincent Rudolph
*Assistant Examiner* — Helen Q Zong
(74) *Attorney, Agent, or Firm* — Canon USA, Inc., I.P. Division

(57) ABSTRACT

There is provided a printing apparatus capable of solving the problem by including a sheet discharge unit configured to discharge data from the first page of the record including a page where a printing error occurs to the page related to the page where the printing error occurs held on a buffer as output products related to the printing error if the printing error occurs, a display unit configured to display on an operation unit a message prompting the removal of the output products discharged by the sheet discharge unit, and a print resumption unit configured to resume printing from the first page of the record including a page where a printing error occurs if the print resumption unit is instructed to resume printing after the display unit displays the message.

4 Claims, 10 Drawing Sheets

FIG. 4

| CUSTOMER NUMBER | NAME | ADDRESS | AGE | MASTER | VDP OBJECT 1 | VDP OBJECT 2 |
|---|---|---|---|---|---|---|
| 301 | 302 | 303 | 304 | 305 | 306 | 307 |
| 00111 | YAMADA | KANAGAWA PREFECTURE | 26 | LINK A | LINK XXX | LINK KKKK |
| 00456 | SUZUKI | TOKYO | 39 | LINK A | XLINK YYYY | LINK KKKK |
| 00684 | SATO | HOKKAIDO | 55 | LINK A | LINK ZZZZ | LINK TTTT |

FIG. 8

```
ERROR REPORT

JOB NAME: VDP JOB 01

ERROR CONTENT: PAPER JAM (FINISHER)

COPY NUMBER: FIRST COPY
RECORD: 152
PAGES IN RECORD: 6
TOTAL PAGE: 1505
```

PRINTING APPARATUS, PRINTING RESUMING METHOD, AND STORAGE MEDIUM

BACKGROUND OF THE INVENTION

1. Field of the Invention

The present invention relates to a printing apparatus, a printing resuming method, and a storage medium.

2. Description of the Related Art

The printing industry runs a business using a product output by a printing machine, so that it is required to output a product higher in quality than the one output in an office. Particularly in a printing company which handles a large amount of print products related to securities or private information such as the estimate of insurance, direct mail, and the specification of a credit card, if duplication or missing page is found, which causes a significant problem concerning the credibility of business.

In recent years, a demand for variable data print for printing data meeting the needs of each customer has been expanding. In variable data print (VDP), customer data registered in one job are printed in units of records. The record refers to a series of process units of the VDP. For example, if print is performed in units of customers, one record is formed of print data for one customer.

In the variable data print, a large number of records can be contained in one job. For example, several thousand to several ten thousand records can be contained in one job. Furthermore, in a VDP job, a VDP object is associated with each record, combined with a master object as a background and printed. In such a VDP, even if a plurality of records is contained, it is managed in units of jobs, which is referred to as a VDP job.

Such a printing company that uses the VDP mostly subjects output products to an appropriate post processing or classification and delivers the output products to customers. In printing a direct mail, for example, the printed direct mail is stapled, folded, and enclosed in an envelope.

Particularly in the VDP job, data are managed for each customer and in units of records, so that an operator may probably process or enclose output products in units of records.

Up to now, most printing machines mainly used in an office have been handled as a unity of data for each job. In this respect, a conventional printing process is largely different from the VDP. There has been a strong demand for developing a printing machine considering the user-friendliness of an operator who performs process in units of records.

In the VDP, Japanese Patent application Laid-Open No. 2009-75634 discusses a technique for recovering an error on the assumption of process in units of records. In Japanese Patent application Laid-Open No. 2009-75634, a record in which an error has occurred is retreated beforehand to a data retreating area, and process is performed excluding the record in printing. After that, the retreated record is presented to the operator to prompt the operator to correct the error.

The technique discussed in Japanese Patent application Laid-Open No. 2009-75634 is superior to a conventional one in that the user-friendliness of an operator who performs process in units of records in the VDP is considered. Since the record in which an error has occurred is automatically excluded, so that such a problem occurs that the order of final output products becomes different from the order designated by the operator. Since the technique is directed mainly to an error occurring in interpreting the VDP, so that such a problem occurs that the effect of the technique is limited to a printing error such as jam occurring in printing process.

Most printing machines mainly used in an office at present are equipped with an error recovery function to resume printing at a page where a printing error has occurred if a printing error such as jam has occurred. In relation to the error recovery function, Japanese Patent application Laid-Open No. 2005-210754 discusses a technique which determines whether to execute a recovery operation based on whether an interrupted job is the one that uses an inserter.

If a printing error occurs, many pages yet to be output are left in an apparatus, which means that a part of the pages is actually redundantly printed. For this reason, a printing error such as a duplication of page or a missing page may occur depending on a timing at which the printing error occurs or due to work mistake by the operator, before or after the page where the printing error occurs, although the probability of occurrence may be low.

Most conventional printing machines start recovery process at the page where the printing error has occurred. The reliability of the recovery process is generally high enough, which hardly causes the duplication of page or the missing page. However, as described above, since the printing industry is required to output a very high-quality product, the operator is required to check the output products after printing is finished in order to avoid the possibility that the printing error may occur, which burdens the operator with a heavy load.

If a large amount of outputs are printed like the VDP, in particular, it is difficult for the operator to identify a place where an error has occurred from the large amount of outputs after printing is finished, and very difficult to confirm if the duplication of page or the missing page has occurred. Thus, a checking work made after printing is finished burdens the operator with a heavy work load.

SUMMARY OF THE INVENTION

According to an aspect of the present invention, a printing apparatus includes a reception unit configured to receive a job containing a plurality of records containing data having a plurality of pages, a print control unit configured to control printing based on the job received by the reception unit, a sheet discharge unit configured to discharge data from the first page of the record including a page where a printing error occurs to the page related to the page where the printing error occurs held on a buffer as output products related to the printing error if the printing error occurs, a display unit configured to display a message on an operation unit prompting the removal of the output products discharged by the sheet discharge unit, and a print resumption unit configured to resume printing from the first page of the record including a page where a printing error occurs if the print resumption unit is instructed to resume printing after the display unit displays the message.

Such a configuration is formed to allow the operator to identify a record which the duplication of page or the missing page may occur, before printing is resumed, if the printing error occurs, and dispose of the record in advance. This eliminates the need for work for identifying the record, which the printing error occurs, after printing is finished to confirm whether the duplication of page or the missing page has occurred. This, therefore, can reduce the operator's work load when the printing error has occurred.

According to an aspect of the present invention, a printing apparatus includes a reception unit configured to receive a job containing a plurality of records containing data having a plurality of pages, a print control unit configured to control printing based on the job received by the reception unit, and a print resumption unit configured to resume printing from the first page of the record including a page where a printing error occurs if the printing error occurs.

Such a configuration is formed to allow the operator to easily distinguish the record in which printing is normally finished from the record including a page where the printing error has occurred. This, therefore, can reduce the operator's work load when the printing error has occurred. According to the present invention, when the printing error has occurred, the operator's work load can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a table exemplarily illustrating a leading portion of spread sheet data read from a record database stored in a file server.

FIG. 8 is an example of an error report notifying the operator of the details of the printing error in step S517 in FIG. 6B.

DESCRIPTION OF THE EMBODIMENTS

Various exemplary embodiments, features, and aspects of the invention will be described in detail below with reference to the drawings.

Figure 1:
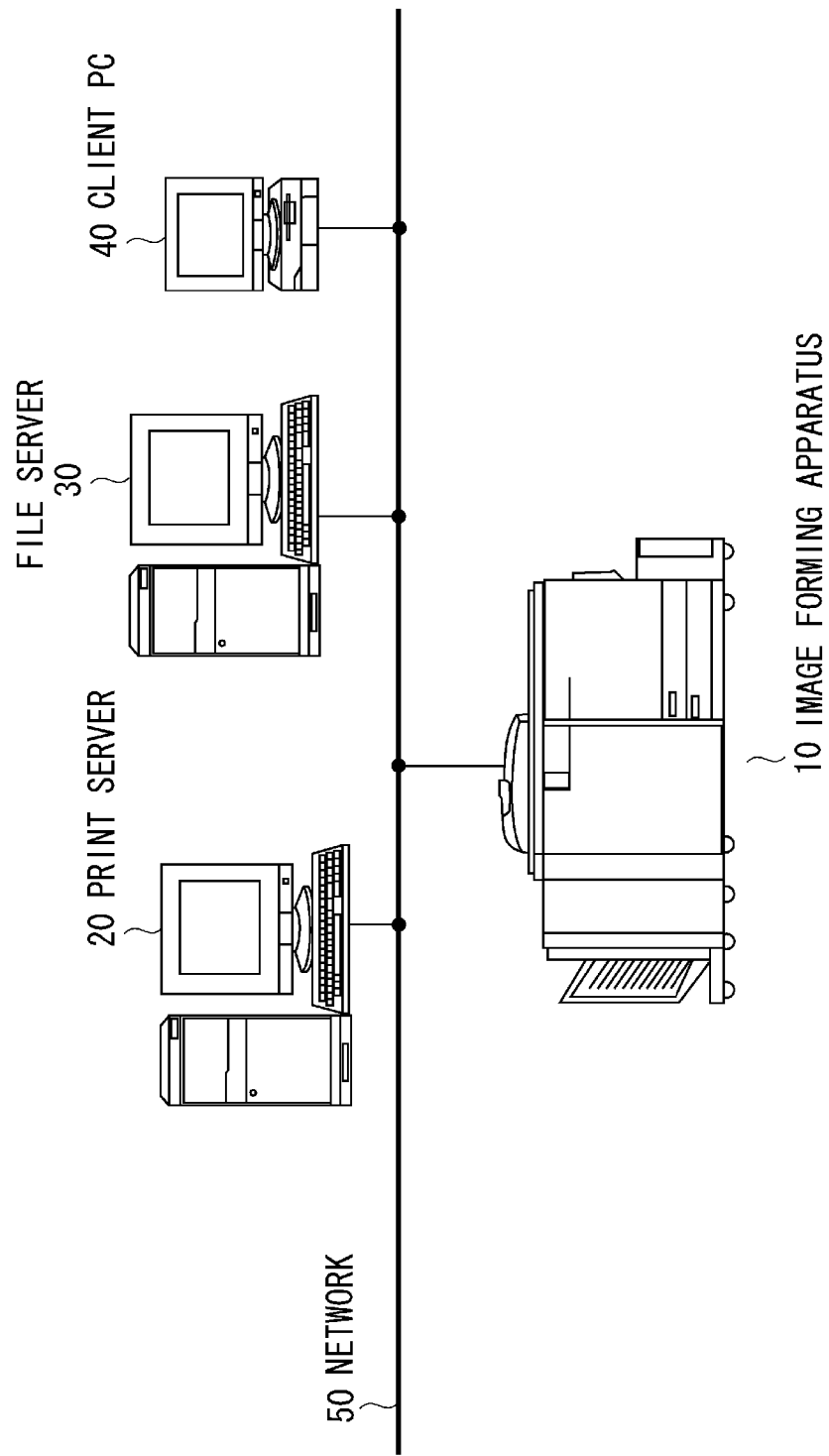
FIG. 1 illustrates an example of a configuration of an image forming system.

An image forming system to which the exemplary embodiment described below is applicable is described. FIG. 1 illustrates an example of a configuration of an image forming system. The image forming system according to the present exemplary embodiment includes an image forming apparatus 10, a print server 20, a file server 30, and a client PC 40. The image forming apparatus 10, the print server 20, the file server 30, and the client PC 40 are communicably connected to one another via a network 50 such as a local area network (LAN) or wide area network (WAN). The image forming apparatus 10 has various functions such as scanning, printing, and copying. The image forming apparatus 10 is an example of a printing apparatus.

The print server 20 manages VDP jobs input from the client PC 40 and the image forming apparatus 10 connected via the network 50. The print server 20 is capable of monitoring the status of the connected image forming apparatus 10 and all the VDP jobs, and performing control such as suspension, setting change, and printing resumption of the VDP job or duplication, change, and deletion thereof.

The file server 30 stores database related to variable data used for variable print. More specifically, customer database includes customer data such as destination, address, and name, for example.

The client PC 40 has a function to edit an application file and issue instructions for printing. Furthermore, the client PC 40 has a function to assist the monitor and control of the image forming apparatus 10 and the VDP jobs managed in the print server 20. An operator can confirm the status of the VDP jobs using the client PC 40.

Figure 2:
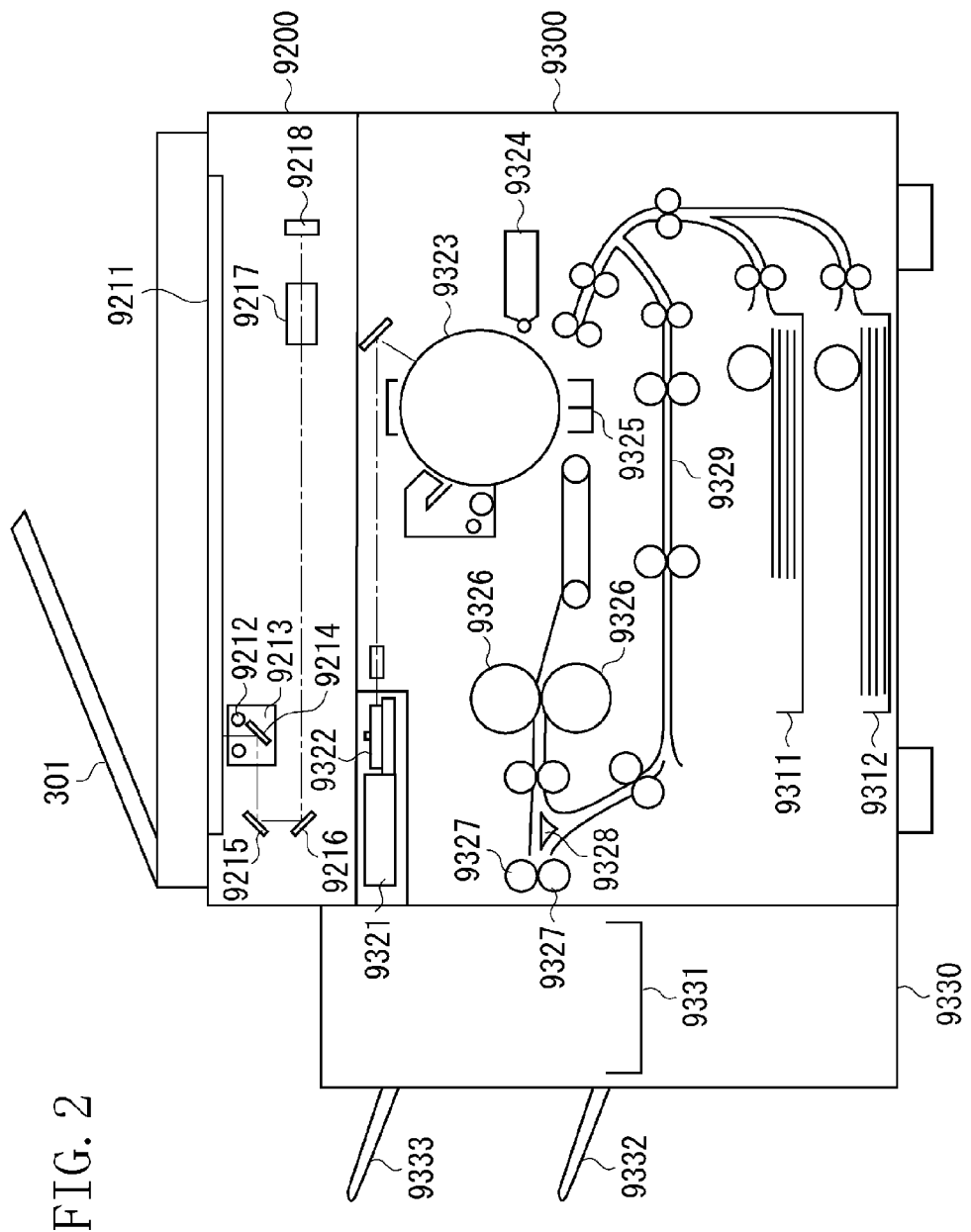
FIG. 2 is a schematic cross section view illustrating a hardware configuration of an image forming apparatus.

FIG. 2 is a schematic diagram illustrating a hardware configuration of the image forming apparatus.

A scanner unit 9200 has a document feeding unit 9250. The document feeding unit 9250 sequentially feeds a document onto a platen glass 9211 one by one from the leading portion thereof. The scanner unit 9200 discharges the document to a discharge tray from the platen glass 9211 every time the reading operation of each document is finished. When the document is fed onto the platen glass 9211, the scanner unit 9200 lights a lamp 9212, and starts the movement of a moving unit 9213.

The movement of the moving unit 9213 scans and reads the document on the platen glass 9211. While the document is being scanned and read, light reflected from the document is led to a CCD image sensor (hereinafter referred to as CCD) 9218 via mirrors 9214, 9215, and 9216 and a lens 9217. An image on the document is formed on the imaging plane of the CCD 9218. The CCD 9218 converts the image formed on the imaging plane into an electric signal. The electric signal is subjected to a predetermined process, and then input to a CPU 200.

A printer unit 9300 includes a laser driver 9321. The laser driver 9321 drives a laser emitting unit 9322 based on the image data input from the CPU 200. Thereby, the laser emitting unit 9322 emits a laser beam according to the image data. A photosensitive drum 9323 is irradiated with the laser beam which is being scanned.

An electrostatic latent image is formed on the photosensitive drum 9323 by the laser beam with which the photosensitive drum 9323 is irradiated. The electrostatic latent image is visualized by a toner supplied from a developer 9324. Recording paper is fed to between the photosensitive drum 9323 and a transfer unit 9325 from cassettes 9311 and 9312 via a conveyance path in synchronization with a timing at which the drum is irradiated with the laser beam. A toner image on the photosensitive drum 9323 is transferred onto the fed recording paper by the transfer unit 9325.

The recording paper onto which the toner image is transferred is fed to a fixing roller pair (a heating roller and a pressure roller) 9326 via a conveyance belt. The fixing roller pair 9326 heats and presses the recording paper to fix the toner image on the recording paper to the recording paper. The recording paper passing through the fixing roller pair 9326 is discharged to a sheet discharge unit 9330 by a sheet discharge roller pair 9327.

If a two-sided recording mode is set, the recording paper is conveyed to the sheet discharge roller pair 9327 and then the rotational direction of the sheet discharge roller pair 9327 is reversed to lead the recording paper to a paper refeed conveyance path 9329 by a flapper 9328. The recording paper led to the paper refeed conveyance path 9329 is fed again to between the photosensitive drum 9323 and a transfer unit 9325 at the timing described above and the toner image is transferred onto the other side of the recording paper.

The sheet discharge unit 9330 includes a sheet processing apparatus capable of providing post processing such as sorting, punching, and stapling. A buffer 9331 temporarily holds the recording paper before the paper is discharged to sheet discharge portions 9332 and 9333. The sheet discharge portions 9332 and 9333 can be moved up and down. The recording paper held by the buffer 9331 is discharged to either the sheet discharge portions 9332 or 9333.

Figure 3:
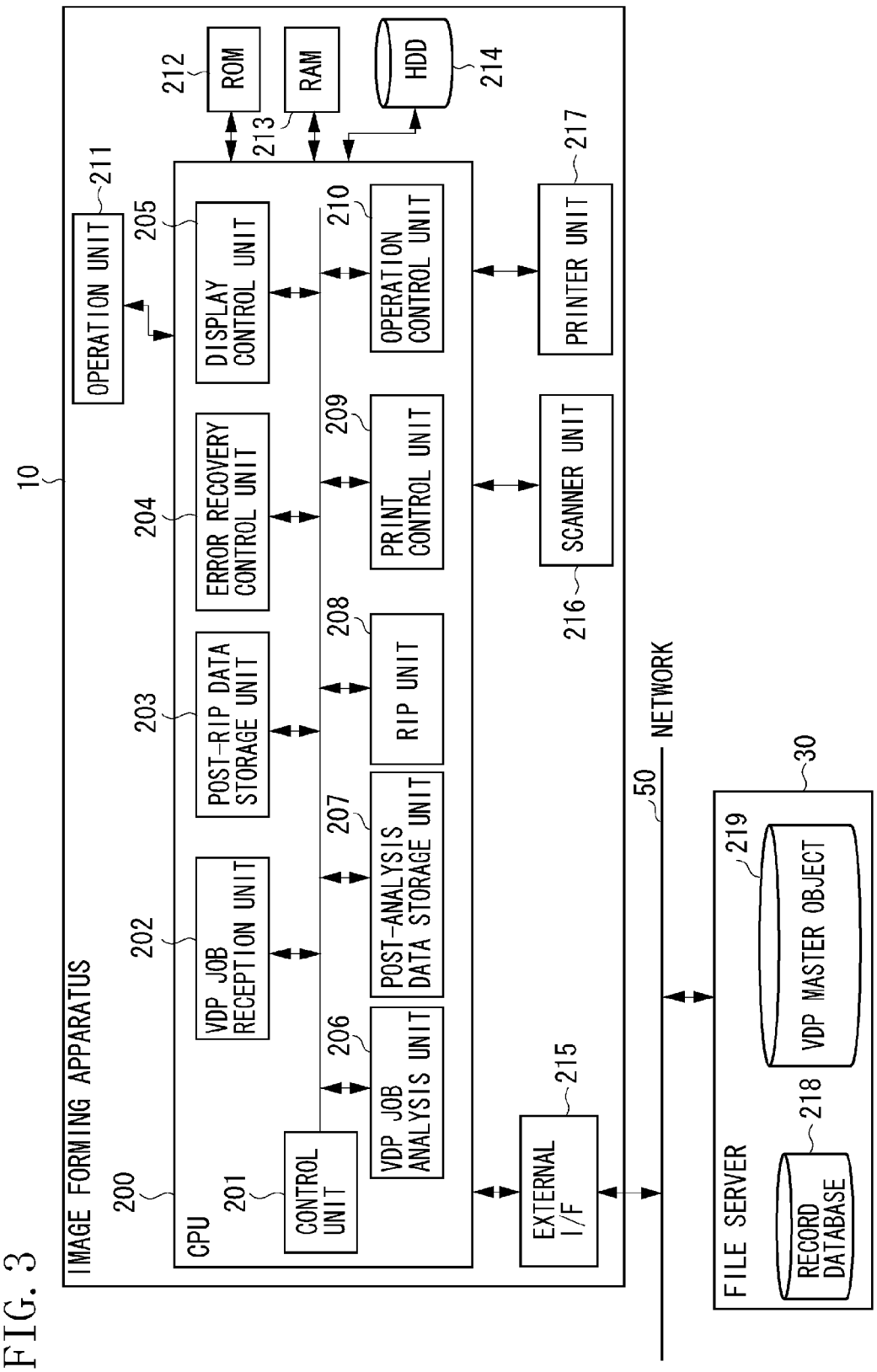
FIG. 3 is a block diagram illustrating an example of a functional configuration of the image forming system.

FIG. 3 is a block diagram illustrating an example of a functional configuration of an image forming system.

A CPU 200 generally controls the processing and the operation of various units of the image forming apparatus 10. An operation unit 211 is used when the operator performs various inputs, and formed of various keys. A ROM 212 is a read only memory and previously stores various programs.

A RAM 213 is a readable and writable memory, and stores image data sent via an external I/F 215, various programs, and setting information. A HDD 214 is a large-capacity storage apparatus for storing image data and capable of storing a plurality of data such as print data of the VDP job to be processed and programs.

The external I/F 215 is connected to the network 50, and transmits and receives image data to and from a facsimile machine, a network connection apparatus, and an external dedicated apparatus.

A scanner unit 216 reads the document on the document feeding unit 9250 to generate image data. The scanner unit 216 corresponds to the scanner unit 9200 in FIG. 2. A printer unit 217 prints image data received from the scanner unit 216 or the external I/F 215. The printer unit 217 corresponds to the printer unit 9300 in FIG. 2.

The CPU 200 reads a program from the HDD 214 in the image forming apparatus 10, stores the program in the RAM 213, and executes process based on the program, thereby realizing the functions described below and the process related to a flow chart.

A control unit 201 controls functional units 202 to 210 of the image forming apparatus 10 to control the operation of the entire image forming apparatus 10. An operation control unit 210 receives input from the various keys of an operation unit 211. The operation control unit 210 notifies the control unit 201 of contents of the input from the various keys. The control unit 201 causes the functional units 202 to 210 to perform processing such as reprinting and the cancel of the VDP job according to the contents of which the operation control unit 210 notifies the control unit 201.

A display control unit 205 performs various displays, and controls a display device such as an LCD or an LED of the operation unit 211.

A VDP job reception unit 202 receives a VDP job input from the client PC 40 via the external I/F 215, and stores the VDP job in the HDD 214. When the above processing is completed, the VDP job reception unit 202 notifies the control unit 201 of the completion of the processing. The control unit 201 receives the notification, and instructs a VDP job analysis unit 206 to analyze the VDP job.

The VDP job analysis unit 206 sequentially performs analysis with reference to the VDP job received from the VDP job reception unit 202 and a record database 218 stored in the file server 30 according to the instructions of the control unit 201. At this point, the VDP job analysis unit 206 refers to a master object and a variable data (DVP) object 219 to which the record refers, and associates the objects with each other.

The VDP job analysis unit 206 transmits the analyzed record to a post-analysis data storage unit 207. The post-analysis data storage unit 207 stores the record received from the VDP job analysis unit 206 in the HDD 214. When the above process is completed, the post-analysis data storage unit 207 notifies the control unit 201 of the completion of the process. The control unit 201 receives the notification and instructs a RIP unit 208 to perform a raster image processor (RIP) process of the analyzed data.

The RIP unit 208 receives the analyzed data from the post-analysis data storage unit 207 according to the instructions of the control unit 201, and performs a raster image processor (RIP) process. The RIP unit 208 transmits post-RIP data to a post-RIP data storage unit 203.

The post-RIP data storage unit 203 stores the post-RIP data received from the RIP unit 208 in the HDD 214. When the above process is completed, the post-RIP data storage unit 203 notifies the control unit 201 of the completion of the process. The control unit 201 receives the notification, and instructs a print control unit 209 to print the post-RIP data.

The print control unit 209 receives the post-RIP data received from the post-RIP data storage unit 203 according to the instructions of the control unit 201 to perform a print process. The print control unit 209 feeds a required media based on print information, and controls the various hardware components illustrated in FIG. 2 to perform the print process according to specified finish setting or specified output method. When the above process is completed, the print control unit 209 notifies the control unit 201 of the completion of the processing.

If a printing error occurs at the above process, the print control unit 209 notifies the control unit 201 of the occurrence of the printing error. The control unit 201 receives the notification, and instructs an error recovery control unit 204 to perform an error recovery process. If the printing error is eliminated, the print control unit 209 notifies the control unit 201 of the elimination of the printing error. The control unit 201 receives the notification, and instructs the error recovery control unit 204 to perform a print resumption process.

The error recovery control unit 204 instructs the print control unit 209 to perform an error recovery process according to the instructions of the control unit 201. The error recovery control unit 204 instructs the display control unit 205 to notify the operator of the occurrence of the printing error. The error recovery control unit 204 controls the print resumption process according to the instructions of the control unit 201. The error recovery control unit 204 instructs the print control unit 209 to resume a print process.

FIG. 4 is a table exemplarily illustrating a leading portion of spread sheet data read from the record database stored in the file server 30.

A customer number, name, address, age, linked page of master file, linked page of an object 1, and linked page of an object 2 are stored in data fields 301, 302, 303, 304, 305, 306, and 307 respectively.

Figure 5:
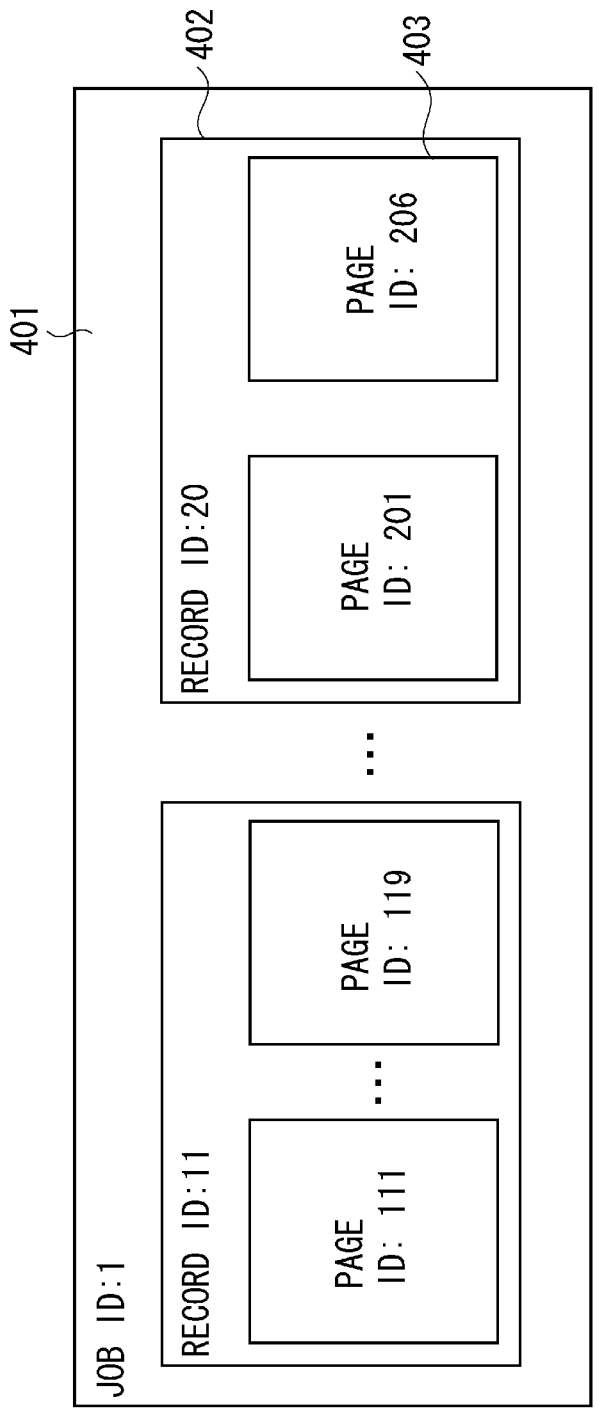
FIG. 5 hierarchically illustrates relations among a VDP job, record, and page.

FIG. 5 hierarchically illustrates relations among a VDP job, record, and page.

A variable data (VDP) job 401 has a plurality of records 402. Record information on which the record 402 is based is stored in the file server 30. In the present exemplary embodiment, the number of customers registered in the record database is equal to the number of records 402 to be printed.

Each record 402 includes one or more pages 403. The numbers of pages included in each record 402 do not always be the same but may be different depending on the contents of print designated in each record 402.

In the present exemplary embodiment, setting as to whether a recovery process is performed in units of records (whether recovery from a printing error is performed in units of records) is held for each record included in the VDP job. This allows setting for each record so that the recovery is performed in units of records for a record high in confidentiality such as an invoice, for example, or the recovery is not performed in units of records for a record low in confidentiality such as advertisement, for example, which enables more flexible operation.

The setting as to whether a recovery process is performed in units of records may be performed by the client PC 40, for example, based on setting operation by the user via a screen or may be automatically performed by the client PC 40 or the print server 20 according to data of a record.

Figure 6A:
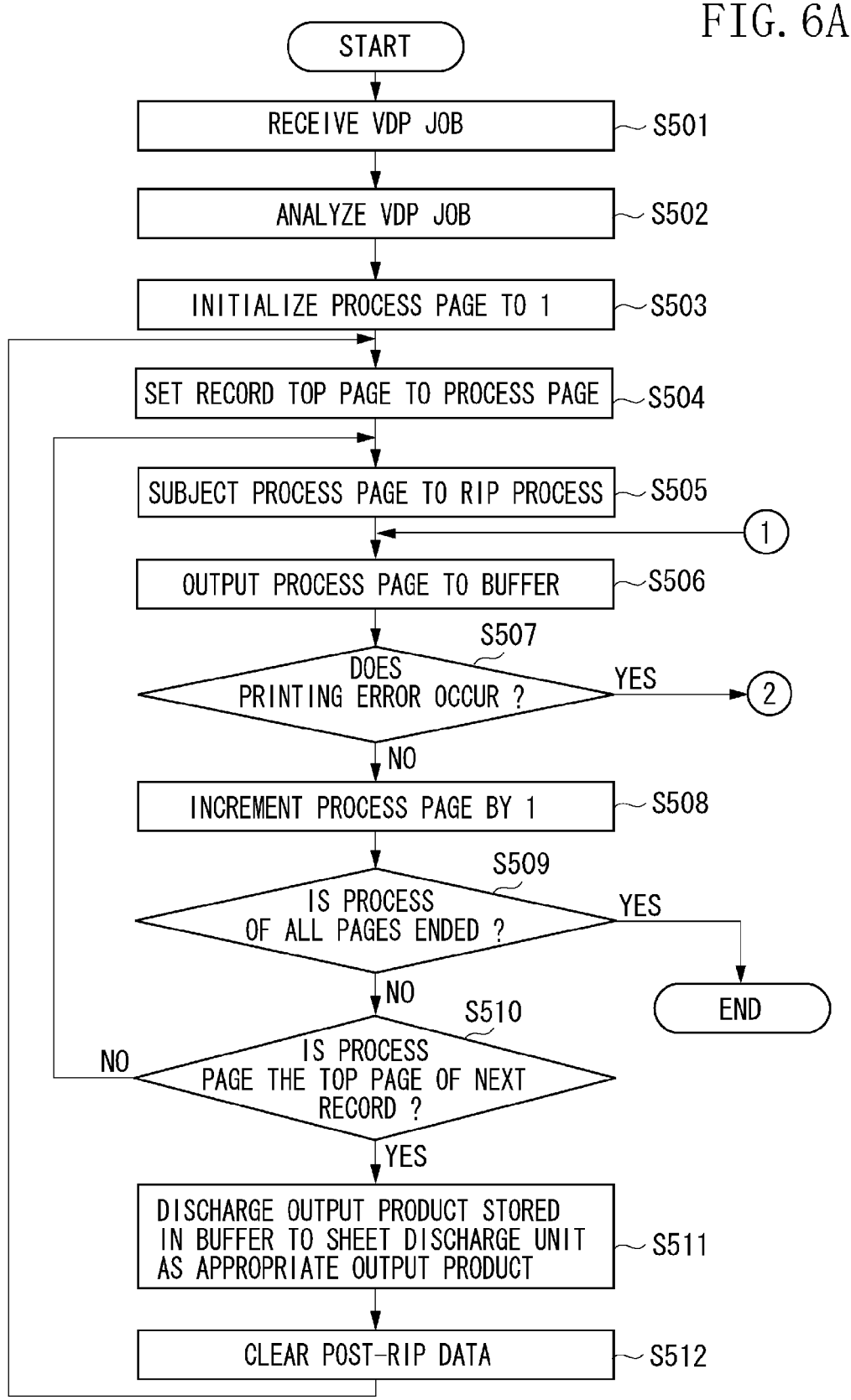
FIGS. 6A and 6B are a flow chart illustrating an example of a recovery process in units of records.
Figure 6B:
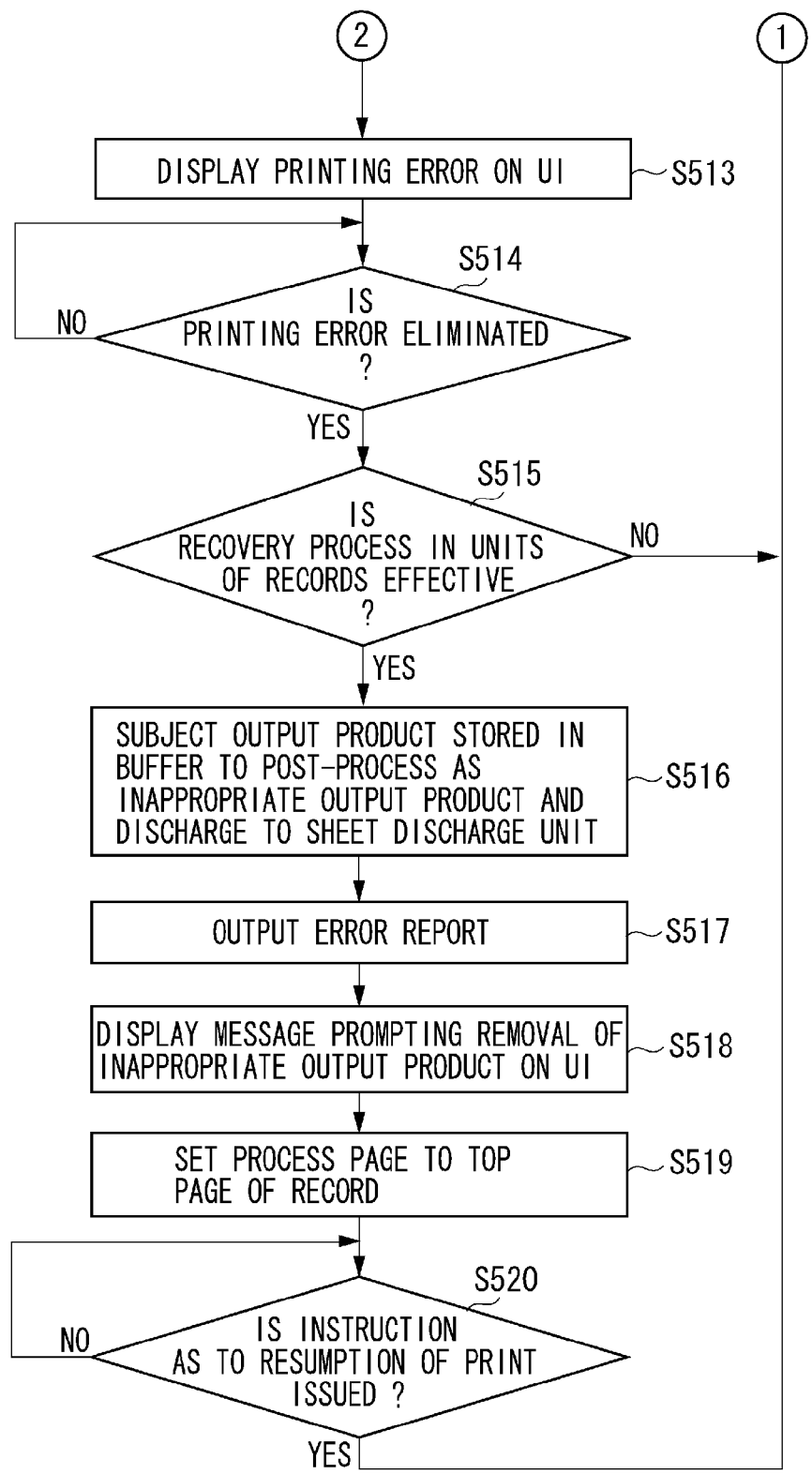

FIGS. 6A and 6B is a flowchart illustrating an example of the recovery process in units of records.

In step S501, the VDP job reception unit 202 receives the VDP job transmitted from the print server 20, and stores the VDP job in the HDD 214. The VDP job received here is the one in a personalized printer marked language (PPML) format, for example. When the above process is completed, the VDP job reception unit 202 notifies the control unit 201 of the completion of the process.

In step S502, the VDP job analysis unit 206 analyses the VDP job according to the instructions of the control unit 201. The VDP job analysis unit 206 reads the record database 218 stored in the file server 30 in analyzing the VDP job, and associates the designated VDP object with a master record. The analyzed data is stored in the post-analysis data storage unit 207.

The recovery process in units of records included in the VDP job is also analyzed in the process, and stored in the post-analysis data storage unit 207. When the above process is completed, the post-analysis data storage unit 207 notifies the control unit 201 of the completion of the process.

In step S503, the control unit 201 initializes a process page to 1. The process page is a variable on the RAM 213 indicating the page to be currently subjected to the RIP and the printing processing. In step S504, the control unit 201 sets the top page of the record as the process page. The top page of the record is a variable on the RAM 213 indicating the top page of the record to be currently subjected to the RIP and the printing processing.

In step S505, the RIP unit 208 subjects the process page of the VDP job to the raster image process (RIP). The data subjected to the RIP is stored in the post-RIP data storage unit 203.

In step S506, the print control unit 209 performs a printing process of the page subjected to the RIP, and outputs a product to the buffer 9331. When the above process is completed, the post-RIP data storage unit 203 notifies the control unit 201 of the completion of the process.

In step S507, the print control unit 209 determines whether a printing error occurs as a result of the above printing process. If the print control unit 209 determines that a printing error has occurred as a result of the printing process (YES in step S507), the print control unit 209 notifies the control unit 201 of the occurrence of the printing error. The processing proceeds to step S513. If the print control unit 209 determines that a printing error does not occur and the printing process is normally completed (NO in step S507), the print control unit 209 notifies the control unit 201 of the completion of the process. Then, the processing proceeds to step S508. In step S508, the control unit 201 increments the process page by 1.

In step S509, the post-analysis data storage unit 207 determines whether the process of all the pages of the VDP jobs is finished according to the instructions of the control unit 201. If the post-analysis data storage unit 207 determines that the process of all the pages is finished (YES in step S509), the post-analysis data storage unit 207 notifies the control unit 201 that the process of all the pages is finished. The process is ended. If the post-analysis data storage unit 207 determines that pages yet to be processed remain (NO in step S509), the post-analysis data storage unit 207 notifies the control unit 201 that the pages yet to be processed remain. Then, the processing proceeds to step S508.

In step S510, the post-analysis data storage unit 207 determines whether the process page is the top of the next record according to the instructions of the control unit 201. If the post-analysis data storage unit 207 determines that the process page is not the top of the record (NO in step S510), pages yet to be processed remain in the record being processed, so that the post-analysis data storage unit 207 notifies the control unit 201 that the pages yet to be processed remain in the record being processed. Then, the processing returns to step S505, and the process is continued. If the post-analysis data storage unit 207 determines that the process page is the top of the record (YES in step S510), the post-analysis data storage unit 207 notifies the control unit 201 that the process page is the top of the record. Then, the processing proceeds to step S511.

In step S511, the print control unit 209 discharges the output product held on the buffer 9331 to the sheet discharge portion 9332 according to the instructions of the control unit 201. The process in steps S501 to S510 ensures that the output products discharged at the present step are the appropriate ones in which errors do not occur during the printing process.

In step S512, the post-RIP data storage unit 203 deletes post-RIP data stored therein according to the instructions of the control unit 201. The process in this step deletes the post-RIP data of the record in which errors have not occurred during the printing process to allow the effective use of the storage area of the HDD 214 used by the post-RIP data storage unit 203.

Figure 7:
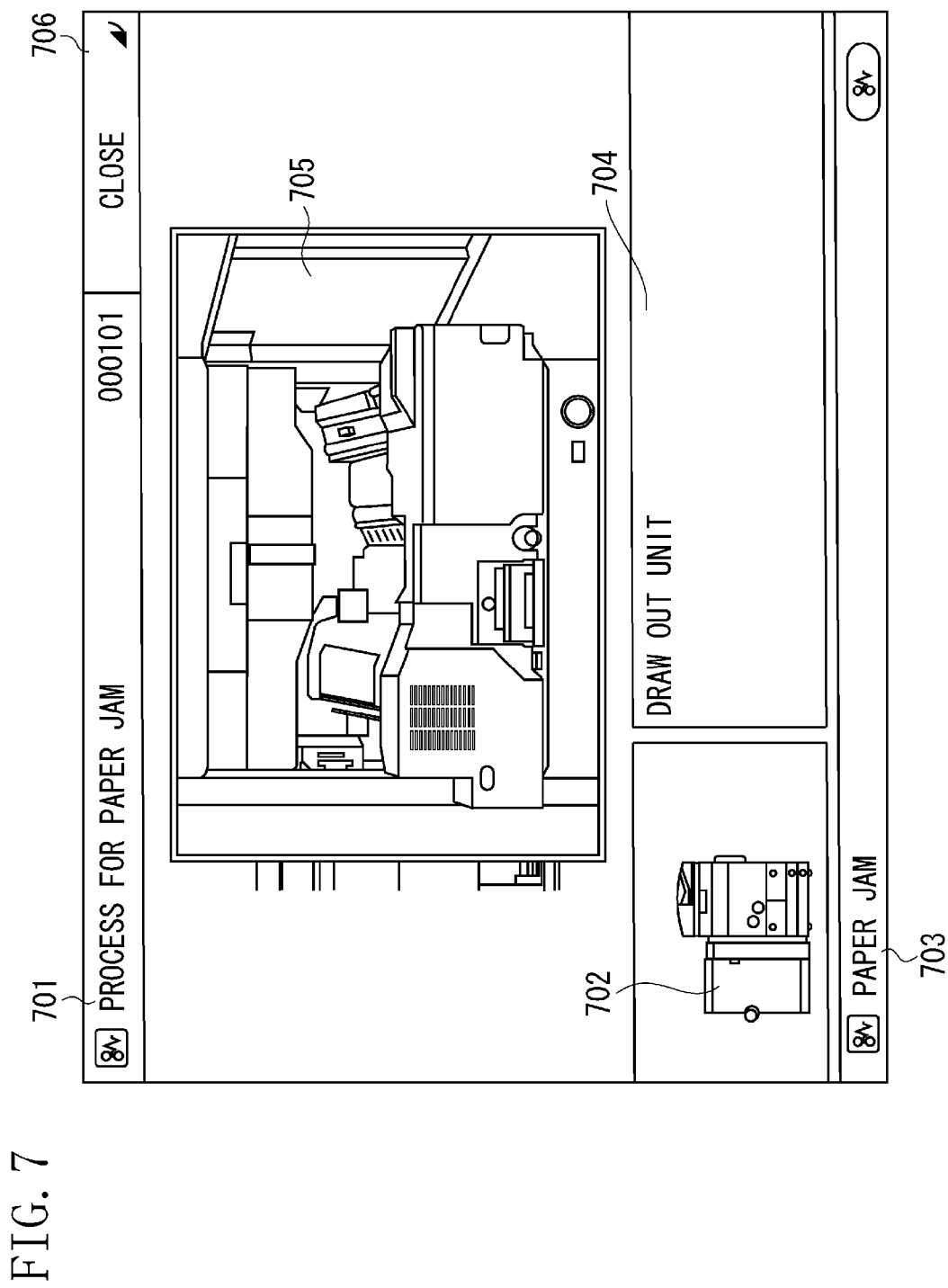
FIG. 7 illustrates an example of a message notifying an operator that a printing failure has occurred in step S513 in FIG. 6B.

In step S513, the display control unit 205 notifies the operator that a printing failure has occurred according to the instructions of the error recovery control unit 204. An example of a displayed message is illustrated in FIG. 7.

In step S514, the print control unit 209 determines whether the printing error is eliminated. If the print control unit 209 determines that the printing error is not eliminated (NO in step S514), the print control unit 209 returns to the main step to stand by until the operator eliminates the printing error. If the print control unit 209 determines that the printing error is eliminated as a result of the operator eliminating the printing error (YES in step S514), the print control unit 209 notifies the control unit 201 that the printing error is eliminated. The control unit 201 receives the notification and instructs the error recovery control unit 204 to resume printing. Then, the processing proceeds to step S515.

In step S515, the post-analysis data storage unit 207 determines whether an instruction for performing the recovery process in units of records on the record that is being processed is given according to the instructions of the error recovery control unit 204. If the post-analysis data storage unit 207 determines that setting for performing the recovery process in units of records on the record being processed is not made (NO in step S515), the post-analysis data storage unit 207 notifies the error recovery control unit 204 that the setting is not performed.

The error recovery control unit 204 having received the notification notifies the control unit 201 of the completion of the process. The processing proceeds to step S506. In step S506 and subsequent steps, the printing process is resumed from the page where the printing has error occurred.

If the post-analysis data storage unit 207 determines that setting for performing the recovery process in units of records on the record being processed is made (YES in step S515), the post-analysis data storage unit 207 notifies the error recovery control unit 204 that the setting is made. Then, the processing proceeds to step S516.

In step S516, the print control unit 209 subjects the output products held on the buffer 9331 to the post processing according to the instructions of the error recovery control unit 204, and discharges the output products to the sheet discharge portion 9333.

The output products discharged at this step by the processing performed in steps S501 to S510 are inappropriate ones in which errors have occurred during the printing process. More specifically, data from the first page of the record of the page where the printing error has occurred to the page related to the page where the printing error has occurred (the preceding page before the page where the printing error has occurred or the page where the printing error has occurred) held on the buffer are output products related to the printing error.

The post processing includes stapling, punching, and shift processing, for example. In the present exemplary embodiment, although the sheet discharge portion 9333 to which the inappropriate output products are discharged in this step is formed differently from the sheet discharge portion 9332 to which the appropriate output products are discharged in step S511, both of the sheet discharge portions may be similar in configuration.

The post processing is not limited to the above examples, and any processing will be accepted as long as an inappropriate output product can be discriminated from an appropriate output product. The process in this step enables the operator to easily discriminate an inappropriate output product from an appropriate output product, and readily eliminate the inappropriate output product.

In step S517, the print control unit 209 outputs an error report notifying the operator of details of the printing error to the sheet discharge portion 9333 according to the instructions of the error recovery control unit 204. Examples of the error report are illustrated in FIG. 8. The operator identifies the position or the number of times of the occurrence of an error through the process in this step, facilitating work such as the check or the reprinting of output products.

Figure 9:
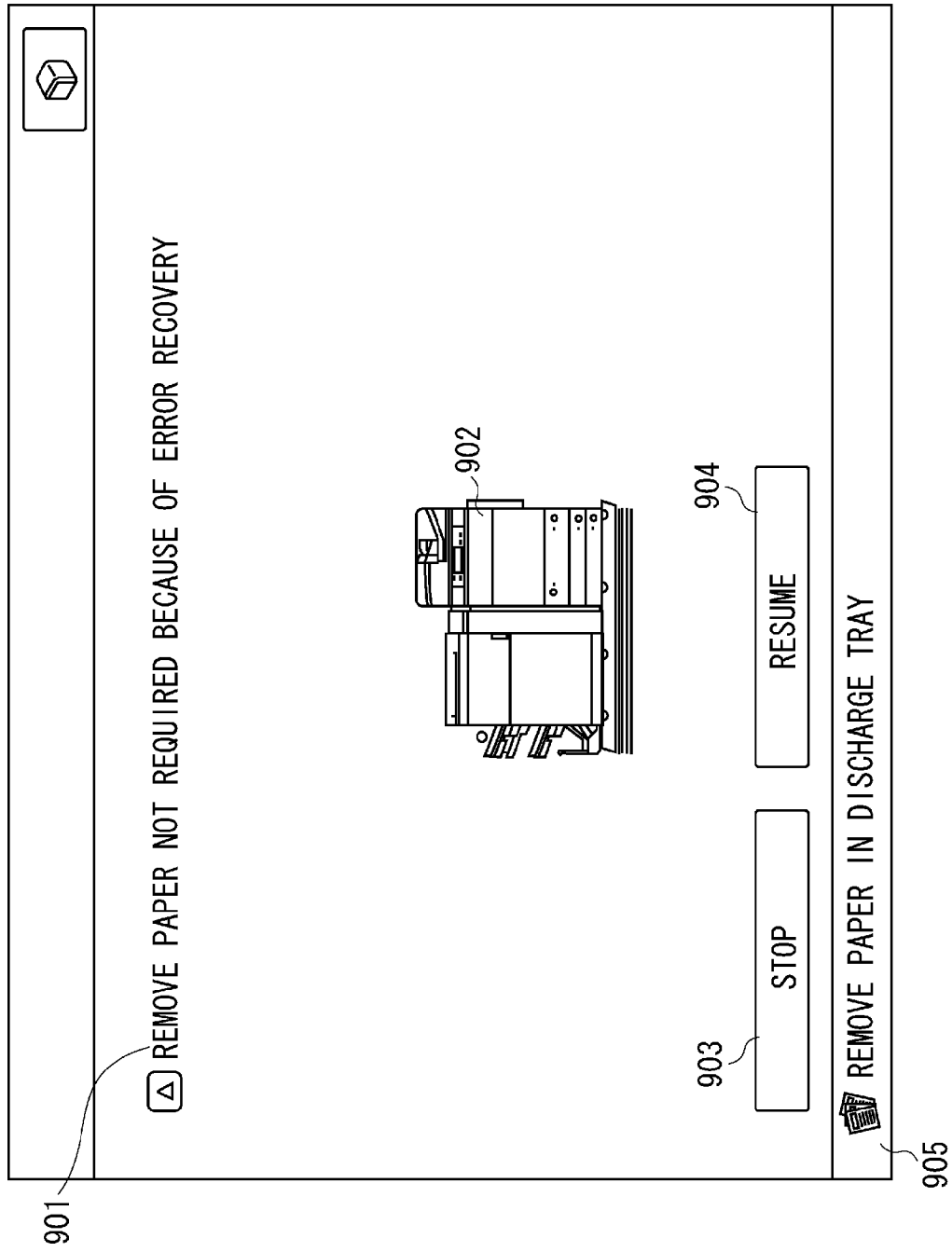
FIG. 9 illustrates an example of a message prompting the operator to remove an inappropriate output product in step S518 in FIG. 6B.

In step S518, the display control unit 205 notifies the operator that the printing failure is eliminated according to the instructions of the error recovery control unit 204 and inappropriate output products subjected to the post processing are discharged to the sheet discharge portion 9333. Furthermore, the display control unit 205 prompts the operator to remove or dispose of the output product and provides the operator with means for inputting an instruction to resume the printing process. An example of a message to be displayed is illustrated in FIG. 9.

In step S519, the control unit 201 sets the top page of the record as the process page. More specifically, the message illustrated in FIG. 9 is displayed and then if the image forming apparatus 10 receives an instruction for resuming printing, the image forming apparatus 10 resumes printing from the first page of the record of the page where the printing error occurs.

In step S520, the operation control unit 210 determines whether the operator issues an instruction for resuming the printing process. If the operation control unit 210 determines that the operator does not issue the instruction for resuming the printing process (NO in step S520), the operation control unit 210 returns to the step to standby until the operator issues the instruction for resuming the printing process. If the operation control unit 210 determines that the operator issues the instruction for resuming the printing process (YES in step S520), the operation control unit 210 notifies the control unit 201 of the completion of the process for resuming the printing process. Then, the processing proceeds to step S506.

The process in this step prevents printing from being resumed against the operator's intention before the operator finishes the work such as the removal of an inappropriate output product or the check of a print product, thereby facilitating the operator's work.

In step S506 and subsequent steps, the printing process is resumed from the top of the record that is being printed. The process in this step resumes printing using the post-RIP data stored in the HDD 214 to make the process for resuming the printing process faster than the case where the processing page is again subjected to the RIP process (if the processing proceeds to step S505).

FIG. 7 illustrates an example of a message notifying the operator of the occurrence of a printing failure in step S513 in FIG. 6B.

A title 701 denoting the content of a message represents that the message is the one concerning the process for paper jam. A position 702 indicates the position where an error occurs, which represents that paper jam occurs in the vicinity of the photosensitive drum 9323 and the sheet discharge unit 9330. A status bar 703 indicates the status of the image forming apparatus 10, and, more specifically, that paper jam occurs in the image forming apparatus 10.

An instruction 704 represents the instruction for the operator to eliminate the error. A work image 705 illustrates the image of the content of the instruction 704. A button 706 is used to close the screen of the massage and receive the input of the operator's instruction for moving to another screen. The screen displayed by pressing the button 706 is not described in the present exemplary embodiment.

FIG. 8 illustrates an example of an error report notifying the operator of the details of the printing error in step S517 in FIG. 6B.

In the present exemplary embodiment, as illustrated in FIG. 8, the operator is notified of the content of an error, a job name, a copy number, a record number, a page number in a record, and the page numbers through total pages. The operator refers to the error report to identify the place or the number of times of the occurrence of errors, thus facilitating work such as the check or the reprinting of output products.

FIG. 9 illustrates an example of a message instructing the operator to remove an inappropriate output product in step S518 in FIG. 6B.

An instruction 901 is an instruction that prompts the operator to remove an inappropriate output product. A position 902 indicates a position where the inappropriate output product exists, which represents that the inappropriate output product exists in the sheet discharge portion 9333.

A button 903 is used to receive the input of the operator's instruction for stopping print. When the button 903 is pressed, the control unit 201 stops the printing process of the job. The details of the process in a case where the button 903 is pressed are not described in the present exemplary embodiment.

A button 904 is used to receive the input of the operator's instructions for resuming print. When the button 904 is pressed (YES in step S520), the operation control unit 210 closes the screen of the massage and resumes the printing process in step S506 and the subsequent steps in FIG. 6A.

The operation control unit 210 stands by until the operator issues an instruction for resuming the printing process to prevent printing from being resumed against the operator's intention before the operator finishes the work such as the removal of an inappropriate output product or the check of a print product, thus facilitating the operator's work.

A status bar 905 indicates the status of the image forming apparatus 10, and, more specifically, that an inappropriate output product exists in the image forming apparatus 10.

The above exemplary embodiments can also be realized by executing the following process. More specifically, the process is such that a software program for realizing the functions of the above-described exemplary embodiments is supplied to a system or an apparatus via various media, and the computer (or a CPU or an MPU) of the system or the apparatus reads and executes the program.

The above-described exemplary embodiments can reduce an operator's work load when the printing error occurs.

According to the above-described exemplary embodiments, the recovery process is performed in units of records if the printing error occurs, which allows the operator to identify the record in which the duplication of page or the missing page may occur before printing is resumed and dispose of the record in advance.

This eliminates the need for work for identifying the record in which the printing error occurs after printing is finished to confirm whether the duplication of page or the missing page occurs. For this reason, an operator's work load can be significantly reduced if a large number of products are output like the VDP in particular.

The exemplary embodiments of the present invention are described above in details. The present invention is not limited to such specific exemplary embodiments, and it is to be understood that the embodiments can be changed and modified without departing from the scope and spirit of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-279425 filed Dec. 9, 2009, which is hereby incorporated by reference herein in its entirety.

What is claimed is:

1. A printing apparatus comprising:
    a reception unit configured to receive a job containing data divided into a plurality of records, each record containing data of a plurality of pages, wherein a printing error recovery setting has been preset, for each record, as recovery by record unit or not;
    a print control unit configured to control printing based on the job received by the reception unit and to determine if a printing error has occurred;
    a determination unit configured to determine if the printing error recovery setting for the record in which the printing error occurred is set to recovery by record unit;
    a printing error display unit configured to, in a case where a printing error occurs, display the printing error on an operation unit;
    a sheet discharge unit configured to discharge recording media, held on a buffer tray, when the print control unit determines a printing error has occurred while printing a record in which the printing error recovery setting has been set to recovery by record unit, the recording media including pages from the first page of the record to the page related to the page where the printing error occurred;
    a display unit configured to display a message on the operation unit prompting the removal of the recording media discharged by the sheet discharge unit; and
    a print resumption unit configured to resume printing from the first page of the record in which the printing error occurred if the print resumption unit is instructed to resume printing after the display unit displays the message.

2. The printing apparatus according to claim 1, further comprising:
    if the determination unit determines the printing error recovery setting for the record in which the printing error occurred is set to recovery by record unit, the sheet discharge unit performs post-processing on the recording media held on the buffer tray and related to the record in which the printing error occurred, before discharging the recording media to the discharge tray.

3. A printing resuming method executed by a printing apparatus, the method comprising:
    receiving a job containing data divided into a plurality of records, each record containing data of a plurality of pages, wherein a printing error recovery setting has been preset, for each record, as recovery by record unit or not;
    controlling printing based on the received job and determining if a printing error has occurred;
    determining if the printing error recovery setting for the record in which the printing error occurred is set to recovery by record unit;
    display the printing error on an operation unit, in a case where a printing error occurs;
    discharging recording media, held on a buffer tray, when it is determined that a printing error has occurred while printing a record in which the printing error recovery setting has been set to recovery by record unit, the recording media including pages from the first page of the record to the page related to the page where the printing error occurred;
    displaying a message on the operation unit prompting the removal of the discharged recording media; and
    resuming printing from the first page of the record in which the printing error occurred if an instruction to resume printing is received after the message is displayed.

4. A computer-readable storage medium storing a program for causing a computer to execute a method comprising:
    receiving a job containing data divided into a plurality of records each record containing data of a plurality of pages, wherein a printing error recovery setting has been preset, for each record, as recovery by record unit or not;
    controlling printing based on the received job and determining if a printing error has occurred;
    determining if the printing error recovery setting for the record in which the printing error occurred is set to recovery by record unit;
    display the printing error on an operation unit, in a case where a printing error occurs;
    discharging recording media, held on a buffer tray, when it is determined that a printing error has occurred while printing a record in which the printing error recovery setting has been set to recovery by record unit, the recording media including pages from the first page of the record to the page related to the page where the printing error occurred;
    displaying a message on the operation unit prompting the removal of the discharged recording media; and resuming printing from the first page of the record in which the printing error occurred if an instruction to resume printing is received after the message is displayed.

* * * * *